United States Patent
Bauer et al.

(10) Patent No.: US 7,318,512 B2
(45) Date of Patent: Jan. 15, 2008

(54) DUAL CLUTCH TRANSMISSION WITH RADIALLY NESTED CLUTCHES HAVING A COMMON DISK CARRIER

(75) Inventors: Karl-Heinz Bauer, Taunusstrasse (DE);
Rainer Gerathewohl, Gruenewaldstrasse (DE); Frank Guenter, Egerlandstrasse (DE);
Hans-Juergen Hauck, Altenhausen (DE); Klaus Heber, Brucknerstrasse (DE); Johannes Heinrich, Frankfurter (DE); Carsten Weinhold, Ludewigstrasse (DE)

(73) Assignee: BorgWarner Inc., Auburn Hills, MI (US)

( * ) Notice: Subject to any disclaimer, the term of this patent is extended or adjusted under 35 U.S.C. 154(b) by 267 days.

(21) Appl. No.: 11/146,844

(22) Filed: Jun. 7, 2005

(65) Prior Publication Data
US 2005/0284725 A1    Dec. 29, 2005

(30) Foreign Application Priority Data
Jun. 29, 2004    (EP) .................................. 04015206

(51) Int. Cl.
*F16D 25/10* (2006.01)
(52) U.S. Cl. ................. 192/87.11; 192/106 F
(58) Field of Classification Search ............. 192/87.11, 192/87.14
See application file for complete search history.

(56) References Cited

U.S. PATENT DOCUMENTS

| | | | |
|---|---|---|---|
| 1,233,561 A | 7/1917 | Dornfeld | |
| 2,174,395 A | 9/1939 | Aikman | 188/153 |
| 2,639,013 A | 5/1953 | Meschia | 192/70.22 |
| 2,919,778 A | 1/1960 | Aschauer | 192/86 |
| 3,171,522 A | 3/1965 | Petrie et al. | 192/69 |
| 3,534,842 A | 10/1970 | Davison, Jr. | 192/113 |
| 3,537,556 A | 11/1970 | Pfeffer | 192/70.28 |
| 3,612,237 A | 10/1971 | Honda | 192/85 |
| 3,654,692 A | 4/1972 | Goetz | 29/558 |
| 3,834,503 A | 9/1974 | Maurer et al. | 192/113 |
| 3,858,698 A | 1/1975 | Hause | 192/89 |
| 4,081,065 A | 3/1978 | Smyth et al. | |
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,060 A | 11/1982 | Smyth | 74/866 |

(Continued)

FOREIGN PATENT DOCUMENTS

DE    871 857    7/1949

(Continued)

*Primary Examiner*—Richard M Lorence
(74) *Attorney, Agent, or Firm*—Bliss McGlynn, P.C.

(57) ABSTRACT

A dual clutch transmission having radially nested clutches includes an outer clutch having a plurality of first outer clutch disks, a plurality of first inner clutch disks, and a first inner support carrier, with the first inner clutch disks operatively mounted to the first inner carrier. The transmission further includes an inner clutch having a plurality of second outer clutch disks, a plurality of second inner clutch disks, and a second inner support carrier is included. The second inner clutch disks are operatively mounted to the second inner carrier. A common disk carrier having a first outer clutch disk carrier operatively supports the first outer clutch disks of the outer clutch and a second outer clutch disk carrier that operatively supports the second outer clutch disks of the inner clutch.

4 Claims, 4 Drawing Sheets

U.S. PATENT DOCUMENTS

| | | | |
|---|---|---|---|
| 4,372,434 A | 2/1983 | Aschauer | 192/85 |
| 4,501,676 A | 2/1985 | Moorhouse | 252/12 |
| 4,548,306 A | 10/1985 | Hartz | 192/70.28 |
| 4,646,891 A | 3/1987 | Braun | 192/0.032 |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,802,564 A | 2/1989 | Stodt | 192/70.28 |
| 4,808,015 A | 2/1989 | Babcock | 384/609 |
| 4,827,784 A | 5/1989 | Muller et al. | 74/330 |
| 5,174,420 A | 12/1992 | DeWald et al. | 188/264 |
| 5,232,411 A | 8/1993 | Hayashi et al. | 475/146 |
| 5,275,267 A | 1/1994 | Slicker | 192/0.033 |
| 5,284,232 A | 2/1994 | Prud'Homme | 192/70.21 |
| 5,305,863 A | 4/1994 | Gooch et al. | 192/70.12 |
| 5,383,544 A | 1/1995 | Patel | 192/70.28 |
| 5,439,088 A | 8/1995 | Michioka et al. | 192/85 |
| 5,450,934 A | 9/1995 | Maucher | 192/70.25 |
| 5,469,943 A | 11/1995 | Hill et al. | 188/264 |
| 5,495,927 A | 3/1996 | Samie et al. | 192/70.12 |
| 5,499,704 A | 3/1996 | Hays | 192/89.23 |
| 5,505,286 A | 4/1996 | Nash | 192/70.27 |
| 5,538,121 A | 7/1996 | Hering | 192/70.12 |
| 5,577,588 A | 11/1996 | Raszkowski | 192/113.35 |
| 5,613,588 A | 3/1997 | Vu | 192/113.35 |
| 5,634,541 A | 6/1997 | Maucher | 192/70.25 |
| 5,755,314 A | 5/1998 | Kanda et al. | 192/70.12 |
| 5,899,310 A | 5/1999 | Mizuta | 192/107 |
| 5,908,100 A | 6/1999 | Szadkowski et al. | 192/214.1 |
| 5,918,715 A | 7/1999 | Ruth et al. | 192/46 |
| 6,000,510 A | 12/1999 | Kirkwood et al. | 192/3.29 |
| 6,026,944 A | 2/2000 | Satou et al. | 192/70.28 |
| 6,071,211 A | 6/2000 | Liu et al. | 477/175 |
| 6,116,397 A | 9/2000 | Kosumi et al. | 192/89.23 |
| 6,189,669 B1 | 2/2001 | Kremer et al. | 192/70.12 |
| 6,217,479 B1 | 4/2001 | Brown et al. | 477/86 |
| 6,244,407 B1 | 6/2001 | Kremer et al. | 192/70.12 |
| 6,299,565 B1 | 10/2001 | Jain et al. | 477/143 |
| 6,419,062 B1 | 7/2002 | Crowe | 192/89.23 |
| 6,523,657 B1 * | 2/2003 | Kundermann et al. | 192/48.8 |
| 6,868,949 B2 | 3/2005 | Braford, Jr. | 192/55.61 |
| 2002/0014386 A1 | 2/2002 | Diemer et al. | 192/70.14 |
| 2003/0057051 A1 | 3/2003 | Alfredsson | 192/87.15 |
| 2003/0075413 A1 | 4/2003 | Alfredsson | 192/87.15 |
| 2003/0178275 A1 | 9/2003 | Breier et al. | 192/3.29 |
| 2004/0060793 A1 | 4/2004 | Dacho et al. | 192/3.29 |
| 2005/0000774 A1 * | 1/2005 | Friedmann | 192/48.8 |
| 2005/0279605 A1 * | 12/2005 | Sowul et al. | 192/48.91 |

FOREIGN PATENT DOCUMENTS

| | | |
|---|---|---|
| DE | 953 406 | 11/1956 |
| DE | 1 217 800 | 5/1966 |
| DE | 31 18 565 A1 | 11/1982 |
| DE | 3149 880 C2 | 4/1985 |
| DE | 35 32 759 C1 | 3/1987 |
| DE | 100 34 677 A1 | 2/2002 |
| DE | 100 49 474 A1 | 4/2002 |
| DE | 197 00 635 C2 | 6/2002 |
| DE | 101 15 454 A1 | 8/2002 |
| DE | 101 43 834 A1 | 3/2003 |
| EP | 0 762 009 A1 | 3/1997 |
| EP | 0 848 179 A1 | 6/1998 |
| FR | 71.03411 | 9/1972 |
| JP | 4-366032 | 12/1992 |
| JP | 8-2000393 | 8/1996 |
| WO | WO 99/45289 | 9/1999 |

* cited by examiner

DUAL CLUTCH TRANSMISSION WITH RADIALLY NESTED CLUTCHES HAVING A COMMON DISK CARRIER

BACKGROUND OF THE INVENTION

1. Field of the Invention

The present invention relates, generally to a dual clutch transmission and, more specifically, to a dual clutch transmission with radially nested clutches having a common disk carrier.

2. Description of the Related Art

Power shifting transmissions used in motor vehicles are employed to transfer power from the prime mover, or engine, to the driven wheels. Power shifting transmissions can take the form of a dual, or twin, clutch transmission where the torque input from the engine is delivered to two input shafts each supporting a portion of the gear sets. Each input shaft has an associated clutch to selectively transfer torque provided by the engine. Since the input engine torque comes through a single input member, such as the flywheel or crankshaft, one structural arrangement for the dual clutch assembly is to dispose the two clutch assemblies in a single radially nested arrangement. The dual clutch assembly is operatively disposed about the two input shafts, which are also in a co-axial and co-centric arrangement. To selectively engage and disengage their respective input shafts, the two clutches of the dual clutch transmission are each comprised of a set of clutch discs, also referred to as a clutch pack. The clutch packs each include one set of discs physically coupled to one of the input shafts and another set of discs physically coupled to the torque input member. The two sets of clutch discs in each clutch pack are alternately supported by inner and outer disc supports. The clutches are engaged by compressing the two sets of discs together against a fixed back plate.

The conventional structure of radially nested dual clutches comprises an outer clutch with an outer disk carrier supporting the outer disks of the outer clutch and an inner disk carrier supporting the inner disks of the outer clutch. An inner clutch is radially nested within the outer clutch and includes an outer disk carrier supporting the outer disks of the inner clutch and an inner disk carrier supporting the inner disks of the inner clutch. Each clutch comprises an actuating piston to cause the inner and outer disks of the respective clutch to frictionally engage each other and thereby transfer torque from the torque input member to the respective input shaft.

Each piston is axially movable and is guided by a corresponding radial cylinder. The cylinder and actuating piston form a pressure chamber, which can be pressurized by hydraulic fluid in order to bring the disks into (or if necessary out of) frictional engagement. Frequently, a compensating piston is additionally assigned to one or both actuating pistons. The actuating piston and the compensating piston form a compensating chamber. The compensating chamber can also be supplied with hydraulic fluid to compensate for an excess of pressure in the pressure chamber caused by centrifugal force, which occurs in the case of increasing speed. In most conventional designs, although radially nested, the two clutches are entirely separate and individually complete. In some variants, the compensating chamber of the outer clutch is formed by the actuating piston of the outer clutch and the outer disk carrier of the inner clutch.

Although the structure of the conventional dual clutches assemblies mentioned above is generally adequate for the intended purpose, they provide radially nested dual clutch assemblies that are needlessly complex and bulky. In the conventional designs, the clutch assemblies are separate each having inner and outer disk support carriers, inner and outer radial guide cylinders, inner and outer compensating pistons, and inner and outer actuating pistons. Thus, the size and weight of the conventional radially nested dual clutch assemblies cause parasitic losses that reduce the efficiency of the transmission and the vehicle. Further, the combination of the numerous nested components is difficult to assemble adding to its overall production costs.

Accordingly, there remains a need in the related art for a dual clutch transmission having a radially nested dual clutch assembly with fewer components, which allows for a lighter, more compact, and more efficient dual clutch assembly. There also remains a need for this type of transmission having a radially nested dual clutch assembly that provides greater efficiency, more cost effective production, and ease of assembly by employing fewer components.

SUMMARY OF THE INVENTION

The disadvantages of the related art are overcome by the present invention of a dual clutch transmission having radially nested clutches with a common disk carrier that includes an outer clutch having a plurality of first outer clutch disks, a plurality of first inner clutch disks, and a first inner support carrier. The first inner clutch disks and the first outer clutch disks are operatively and alternately disposed between each other, with the first inner clutch disks operatively mounted to the first inner carrier. An inner clutch has a plurality of second outer clutch disks, a plurality of second inner clutch disks, and a second inner support carrier. The second inner clutch disks and the second outer clutch disks are operatively and alternately disposed between each other, with the second inner clutch disks operatively mounted to the second inner carrier. A common disk carrier having a first outer clutch disk carrier operatively supports the first outer clutch disks of the outer clutch and a second outer clutch disk carrier that operatively supports the second outer clutch disks of the inner clutch.

In this manner, the radially nested dual clutch assembly for a dual clutch transmission of the present invention has the advantages of reducing weight and space requirements due to reducing the number of necessary components, which increases transmission and vehicle efficiency. Furthermore, the present invention overlaps the actuating and compensating chambers that are employed to control the operation of the clutches. Thus, the manufacturing process is also simplified and made more efficient.

Other objects, features and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
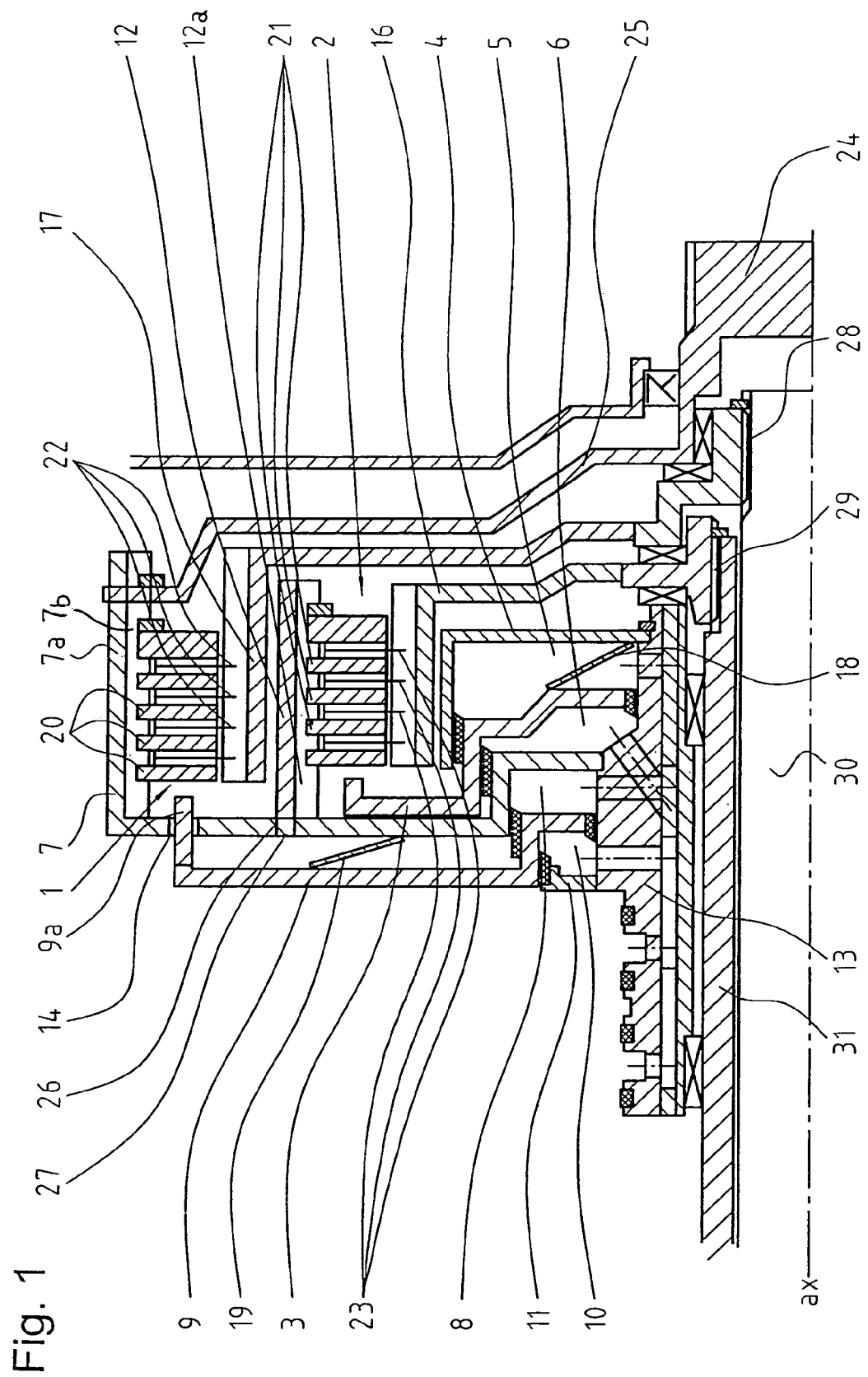
FIG. 1 is a cross-section view of the radially nested clutches having a common disk carrier for a dual clutch transmission of the present invention.

The radially nested dual clutch assembly of a dual clutch transmission in accordance with the present invention is illustrated in FIG. 1. The dual clutch assembly comprises an outer clutch 1 and an inner clutch 2. The outer clutch 1 has a plurality of first outer clutch disks 20, a plurality of first inner clutch disks 22, and a first inner support carrier 17. The first inner clutch disks 22 and the first outer clutch disks 20 are operatively and alternately disposed between each other, with the first inner clutch disks 22 operatively mounted to the first inner carrier 17. The inner clutch 2 has a plurality of second outer clutch disks 21, a plurality of second inner clutch disks 23, and a second inner support carrier 16. The second inner clutch disks 23 and the second outer clutch disks 21 are operatively and alternately disposed between each other, with the second inner clutch disks 23 operatively mounted to the second inner carrier 16. The radially nested dual clutch assembly also includes a common disk carrier 7 having a first outer clutch disk carrier 7a that operatively supports the first outer clutch disks 20 of the outer clutch 1 and a second outer clutch disk carrier 12 that operatively supports the second outer clutch disks 21 of the inner clutch 2.

More specifically, the ring-shaped outer disks 20 and 21 and inner disks 22 and 23 engage one another alternately within their respective outer and inner clutches 1 and 2 to each form a clutch pack. As shown in FIG. 1, the disks 20, 22 of the outer clutch 1 and the disks 21, 23 of the inner clutch 2 are co-axially arranged about an axis of rotation "ax", with the clutch pack of the inner clutch 2 radially arranged, or nested within the clutch pack of the outer clutch 1. In the preferred embodiment, the plurality of outer disks 20 are operatively retained within the first outer disk carrier 7 by raised portions 7b that correspond to notches or grooves in the outer disks 20. The plurality of outer disks 21 likewise retained within the second outer disk carrier 12 by raised portions 12a that correspond to notches or grooves in the outer disks 21. Both sets of inner disks 22 and 23 are first mounted to sleeves that are inserted in the respective inner disk carriers 17 and 16. It should be appreciated that the sleeves that retain the disks of the clutch packs may be mounted within the inner and outer carriers by any of a variety of attachment methods, such as a splined connection, or welding, for example. It should be further appreciated that within the scope of the present invention the sleeves may be omitted such that the inner and outer disks are directly mounted to, and retained on the carriers.

A first actuating piston 9 is adapted to cause the first inner and first outer disks 20,22 of the outer clutch 1 to operatively engage each other, and a second actuating piston 3 is adapted to cause the second inner and said second outer disks 21, 23 of the inner clutch 2 to operatively engage each other. The actuating pistons 3 and 9 can be selectively actuated to move axially to the right (as illustrated in FIG. 1) to cause the inner and outer disks of the clutch packs to be brought into frictional engagement with each other. The dual clutch assembly further includes a guide cylinder 11 wherein actuating piston 9 is disposed between the guide cylinder 11 and the common disk carrier 7 such that the guide cylinder 11 and actuation piston 9 form a pressure chamber 10 that is adapted to be pressurized to cause actuating piston 9 to actuate the outer clutch 1. Actuation piston 9 and the common disk carrier 7 also form a compensation chamber 8 that is adapted to be pressurized to compensate for excess outer clutch actuation pressure. Thus, actuating piston 9 is guided in its axial displacement along the corresponding guide cylinder 11.

The dual clutch assembly further includes a compensating piston 4 wherein the actuating piston 3 is disposed between the compensating piston 4 and the common disk carrier 7 such that the common disk carrier 7 and actuation piston 3 form a pressure chamber 6 that is adapted to be pressurized to cause actuating piston 3 to actuate the inner clutch 2. Actuation piston 3 and the compensating piston 4 form a compensation chamber 5 that is adapted to be pressurized to compensate for excess inner clutch actuation pressure. Thus, the actuating piston 3 is guided along an axial portion of the common disk carrier 7. The two pressure chambers 6, 10 can be pressurized independently from each other by selectively supplying pressurized hydraulic fluid.

The actuating pistons 3 and 9 are returned to their disengaged position by the biasing force of spring disks 18 and 19, respectively. When either of the pressure chambers 6, 10 are selectively pressurized, the respective actuating pistons 3, 9 are moved against the biasing force of the spring disks 18, 19 to engage the disks of the clutch pack. Additionally, clutch assembly 2 includes a compensating piston 4 that cooperates with the corresponding actuating piston 3 to form a compensating chamber 5. Similarly, clutch assembly 1 employs an axial portion of the common disk carrier 7 that cooperates with actuating piston 9 to form a compensating chamber 8. During the operation of the transmission, as the clutch assemblies 1 and 2 rotate, the compensating chambers 5 and 8 are supplied with hydraulic fluid that is pressurized by the outward centrifugal movement of the hydraulic fluid. The centrifugal hydraulic fluid in the compensating chambers 5, 8 compensates for an excess of pressure in the respective pressure chambers 6, 10 that also arises due to the outward centrifugal force generated by the rotation of the clutch assemblies 1 and 2.

The radially nested dual clutch of the present invention selectively transfers torque from the prime mover to the two input shafts of the transmission. As shown in FIG. 1, a motor drive shaft 24 provides the input torque to a torque input disk 25, to the common disk carrier 7, and to first outer disk carrier 7a of the outer clutch 1 and to the second outer disk carrier 12 of inner clutch 2. Thus, the respective outer clutch disks 20 and 21 of the outer clutch 1 and the inner clutch 2 operatively rotate with the torque input disk 25. As previously mentioned, the dual clutch transmission includes two input shafts as illustrated at 30 and 31 in FIG. 1. The inner disk carrier 16 of the inner clutch 2 is operatively mounted to the first input shaft 31 by a splined connection at 29 and the inner disk carrier 17 of the outer clutch 2 is operatively mounted to the second input shaft 30 by a splined connection at 28.

The outer disk carrier 12 of the inner clutch 2 is formed to include a plurality of teeth 26 running in axial direction ax that engage corresponding openings 27 in the common disk carrier 7. The engagement of the teeth 26 within the openings 27 axially locks the two outer disk carriers 7a and 12 to each other, making them essentially a singular element. The outer disk carrier 7a of the outer clutch 1 is further fixed to the clutch hub 13 that is axially supported by the input shafts 30 and 31. In this manner, torque provided by the motor drive shaft 24 can now be transferred to the input shaft 30 by pressurizing the pressure chamber 10 to cause the actuating piston 9 to move against clutch pack of the outer clutch 1 so that torque is transferred through the clutch pack to the inner disk carrier 17. Torque may also be transferred to the input shaft 31 by pressurizing the pressure chamber 6 to cause the actuating piston 3 to move against the clutch pack of the inner clutch 2 so that torque is transferred through the clutch pack to the inner disk carrier 16.

In order to achieve the greatest possible space savings and component reduction, the dual clutch of the present invention is designed in such a way that the actuating piston 9 of the outer clutch 1 penetrates the common disk carrier 7 of the outer clutch 1. The actuating piston 9 of the outer clutch 1 includes a plurality of extending tabs, or fingers 9a arranged circumferentially that extend through corresponding openings 14 in the common disk carrier 7. When the actuating piston 9 is actuated, the extending tabs 9a operatively engage the clutch pack of the outer clutch 1. Further, the pressure chambers 6, 10 and compensating chambers 5, 8 are radial arranged to overlap and fit within each other to save radial and axial space.

Figure 2:
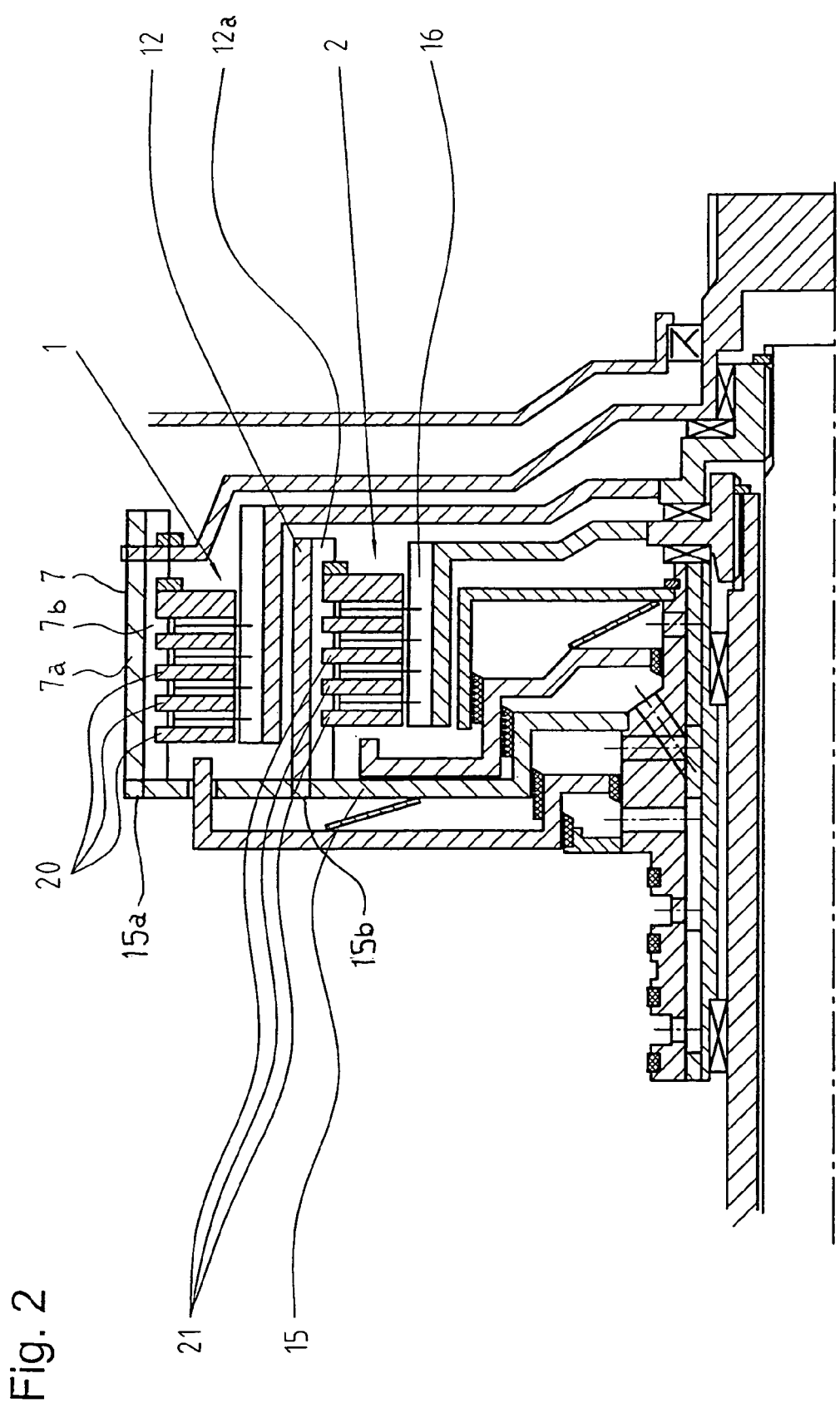
FIG. 2 is a cross-section view illustrating another example of the manner of assembly for the common disk carrier of the present invention shown in FIG. 1.

In addition to the construction of the common disk carrier 7 that includes first and second outer disk carriers 7A and 12 as discussed above and illustrated in FIG. 1. FIG. 2 illustrates another method of producing the common disk carrier 7, where like numerals are used to designate like structure. More specifically, instead of the first single outer disk carrier 7 having the second outer disk carrier 12 mounted by teeth 26 and openings 27, the common disk carrier 7 in FIG. 2 employs a carrier plate 15. The carrier plate 15 includes separate outer disk carriers 7a and 12 that are operatively mounted to the carrier plate 15 at 15a and 15b, respectively. It should be appreciated that attachment of the carriers to the plate may be any of a variety of methods such as welding, or teeth with corresponding openings, for example.

Figure 3:
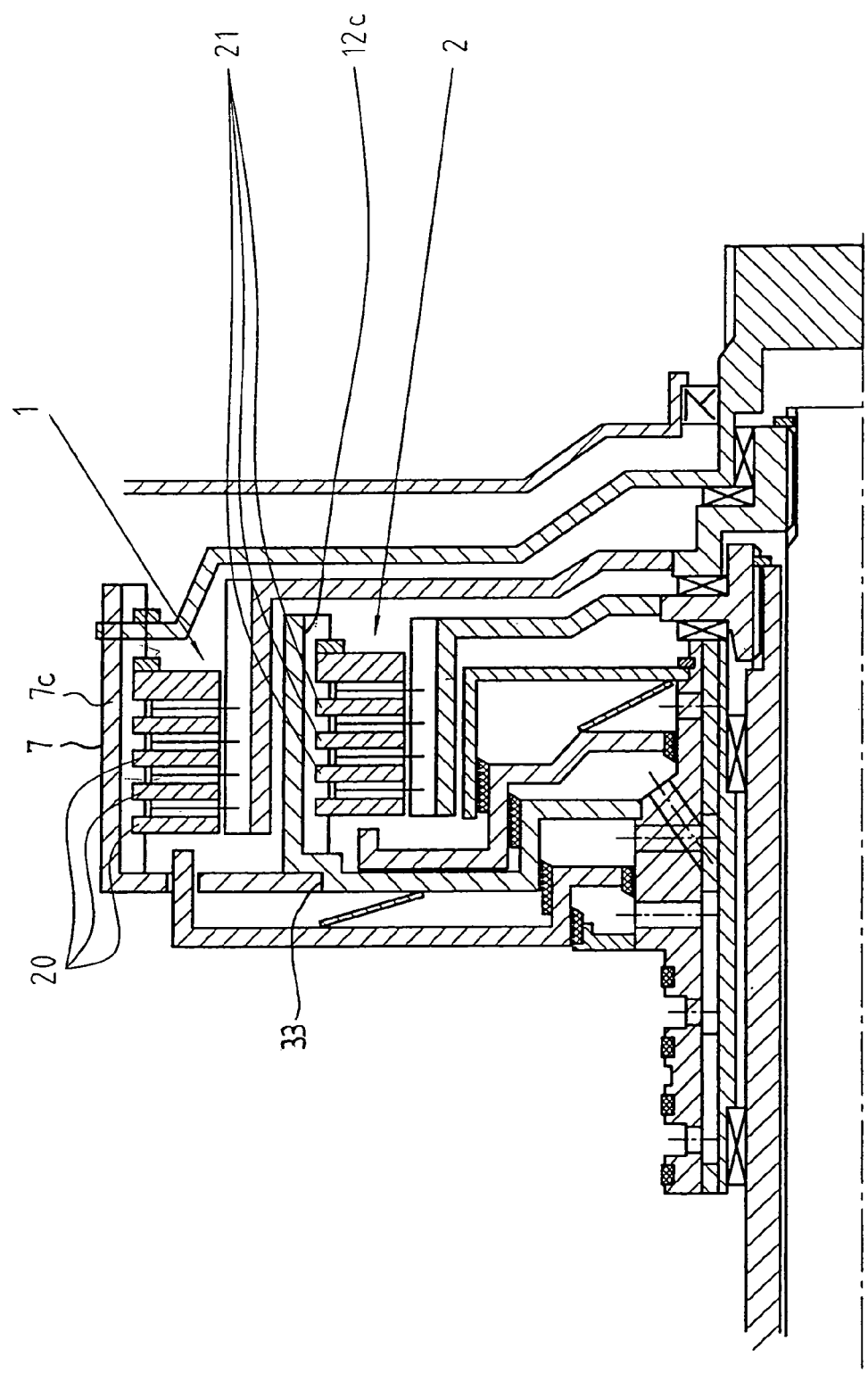
FIG. 3 is a cross-section view illustrating still another example of the manner of assembly for the common disk carrier of the present invention shown in FIG. 1.

Furthermore, another embodiment of the common disk carrier 7 is shown in FIG. 3. In this case, an outer disk carrier 12c is formed as a single piece for the inner clutch 2 and a separate outer disk carrier 7c for the outer clutch 1 is mounted to the outer disk carrier 12c at 33. In the preferred embodiment of the present invention as shown in FIG. 3, the outer disc carrier 7c is welded to the outer disk carrier 12c.

Figure 4:
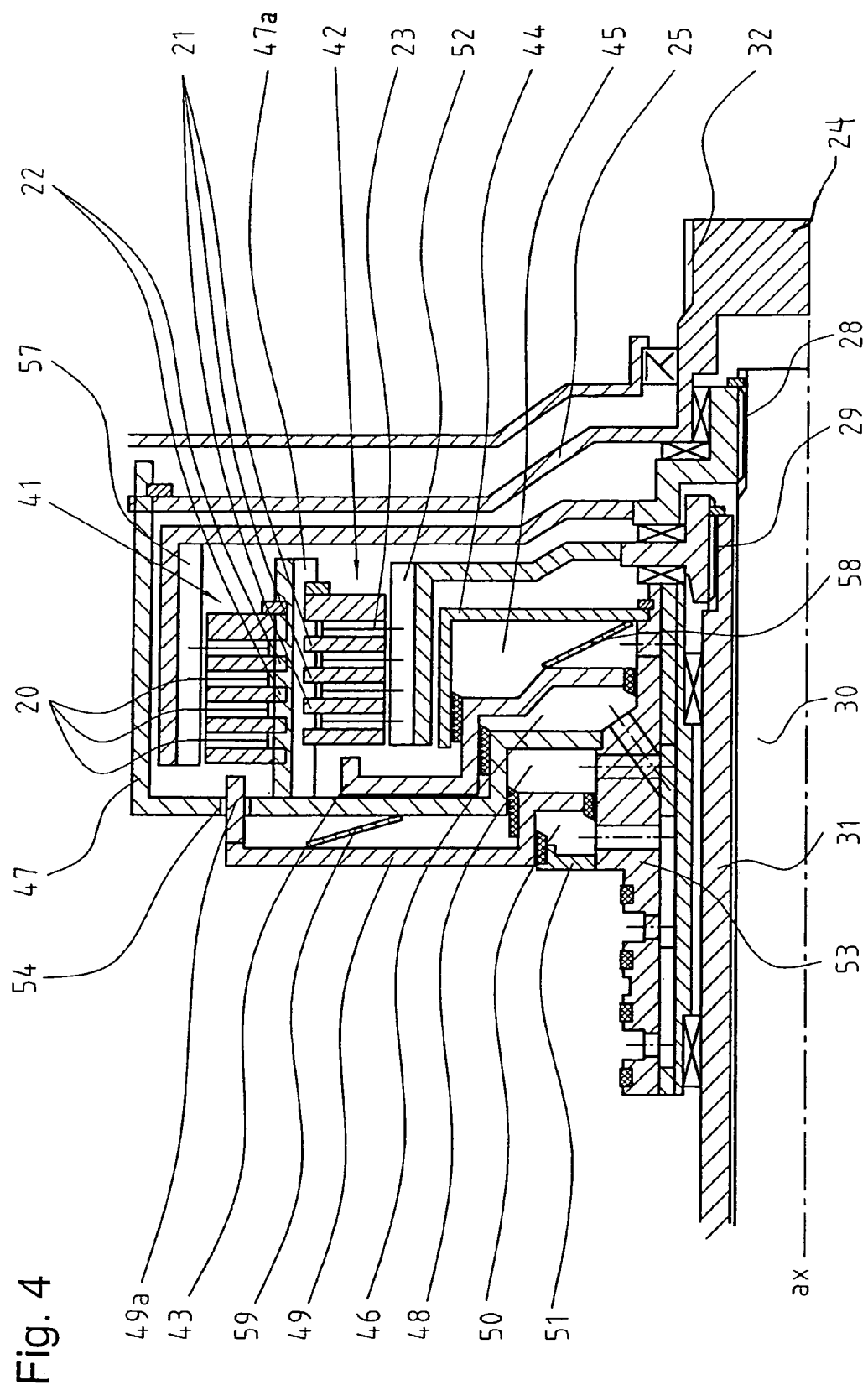
FIG. 4 is a cross-section view of another embodiment of the radially nested clutches having a common disk carrier for a dual clutch transmission of the present invention.

FIG. 4 shows another embodiment of the present invention of a dual clutch transmission with radially nested clutches having a common disk carrier. In this case, the dual clutch assembly includes an outer clutch 41 and an inner clutch 42. The outer clutch 41 has a plurality of first outer clutch disks 20, a plurality of first inner clutch disks 22, and an outer support carrier 57. The first inner clutch disks 22 and the first outer clutch disks 20 are operatively and alternately disposed between each other, with the first outer clutch disks 20 operatively mounted to the outer carrier 57. The inner clutch 42 has a plurality of second outer clutch disks 21, a plurality of second inner clutch disks 23, and a second inner support carrier 52. The second inner clutch disks 23 and the second outer clutch disks 21 are operatively and alternately disposed between each other, with the second inner clutch disks 23 operatively mounted to the second inner carrier 52. The radially nested dual clutch assembly also includes a common disk carrier 47 having a common disk carrier 47a that operatively supports the first inner clutch disks 22 of the outer clutch 1 and the second outer clutch disks 21 of the inner clutch 42.

More specifically, the ring-shaped outer disks 20 and 21 and inner disks 22 and 23 engage one another alternately within their respective outer and inner clutches 41 and 42 to each form a clutch pack. As shown in FIG. 4, the disks 20, 22 of the outer clutch 41 and the disks 21, 23 of the inner clutch 42 are co-axially arranged around an axis of rotation "ax", with the clutch pack of the inner clutch 42 radially arranged, or nested within the clutch pack of the outer clutch 41 about the common disk carrier hub 47a. Each clutch assembly 41, 42 includes an actuating piston 43 and 49, respectively. The pistons 43 and 49 can be actuated to move axially to the right (as illustrated in FIG. 4) to cause the inner and outer disks of the clutch packs to be brought into frictional engagement with each other. The dual clutch assembly further includes a guide cylinder 51 wherein actuating piston 49 is disposed between the guide cylinder 51 and the common disk carrier 47 such that the guide cylinder 51 and actuation piston 49 form a pressure chamber 50 that is adapted to be pressurized to cause actuating piston 49 to actuate the outer clutch 41. Actuation piston 49 and the common disk carrier 47 also form a compensation chamber 48 that is adapted to be pressurized to compensate for excess outer clutch actuation pressure. Thus, actuating piston 49 is guided in its axial displacement along the corresponding guide cylinder 51.

The dual clutch assembly further includes a compensating piston 44 wherein the actuating piston 43 is disposed between the compensating piston 44 and the common disk carrier 47 such that the common disk carrier 47 and actuation piston 43 form a pressure chamber 46 that is adapted to be pressurized to cause actuating piston 43 to actuate the inner clutch 42. Actuation piston 43 and the compensating piston 44 form a compensation chamber 45 that is adapted to be pressurized to compensate for excess inner clutch actuation pressure. Thus, the actuating piston 43 is guided along an axial portion of the common disk carrier 47. The two pressure chambers 46, 50 can be pressurized independently from each other by selectively supplying pressurized hydraulic fluid.

The actuating pistons 43 and 49 are returned to their disengaged position by the biasing force of spring disks 58 and 59, respectively. When either of the pressure chambers 46, 50 are selectively pressurized, the respective actuating pistons 43, 49 are moved against the biasing force of the spring disks 58, 59 to engage the disks of the clutch pack. The actuating pistons 43 and 49 are returned to their disengaged position by the biasing force of spring disks 58 and 59, respectively. When either of the pressure chambers 46, 50 are selectively pressurized, the respective actuating pistons 43, 49 are moved against the biasing force of the spring disks 58, 59 to engage the disks of the clutch pack. Additionally, clutch assembly 42 includes a compensating piston 44 that cooperates with the corresponding actuating piston 43 to form a compensating chamber 45. Similarly, clutch assembly 41 employs an axial portion of the common disk carrier 47 that cooperates with actuating piston 49 to form a compensating chamber 48. During the operation of the transmission, as the clutch assemblies 1 and 2 rotate, the compensating chambers 45 and 48 are supplied with hydraulic fluid that is pressurized by the outward centrifugal movement of the hydraulic fluid. The centrifugal hydraulic fluid in the compensating chambers 45, 48 compensates for an excess of pressure in the respective pressure chambers 46, 50 that also arises due to the outward centrifugal force generated by the rotation of the clutch assemblies 41 and 42.

The radially nested dual clutch of the present invention as shown in FIG. 4 provides to selectively transfer torque from the prime mover to the two input shafts of the transmission. In this case, a motor drive shaft 24 provides the input torque to a torque input disk 25 and to the common disk carrier 47 of the outer clutch 41 and inner clutch 42. Thus, the respective inner clutch disks 21 of the outer clutch 41 and the outer clutch disks 21 of the inner clutch 42 operatively rotate with the torque input disk 25. As previously mentioned, the dual clutch transmission includes two input shafts as illustrated at 30 and 31 in FIG. 4. The inner disk carrier 52 of the inner clutch 42 is operatively mounted to the first input shaft 31 by a splined connection at 29 and the outer disk carrier 57 of the outer clutch 42 is operatively mounted to the second input shaft 30 by a splined connection at 28.

The common disk carrier 47 is further fixed to the clutch hub 13 that is axially supported by the input shafts 30 and 31. In this manner, torque provided by the motor drive shaft 24 can now be transferred to the input shaft 30 by pressurizing the pressure chamber 50 to cause the actuating piston 49 to move against the clutch pack of the outer clutch 41 so that torque is transferred through the clutch pack to the outer disk carrier 57. Torque may also be transferred to the input shaft 31 by pressurizing the pressure chamber 46 to cause the actuating piston 43 to move against clutch pack of the inner clutch 42 so that torque is transferred through the clutch pack to the inner disk carrier 52.

In order to achieve the greatest possible space savings and component reduction, the dual clutch of the present invention is designed in such a way that the actuating piston 49 of the outer clutch 41 penetrates the common disk carrier 47. The actuating piston 49 of the outer clutch 41 includes a plurality of extending tabs, or fingers 49a arranged circumferentially that extend through corresponding openings 54 in the common disk carrier 47. When the actuating piston 49 is actuated, the extending tabs 49a operatively engage the clutch pack of the outer clutch 41. Further, the pressure chambers 46, 50 and compensating chambers 45, 48 are radially arranged to overlap and fit within each other to save radial and axial space.

Thus, the radially nested dual clutch assembly for a dual clutch transmission of the present invention employs a common disk carrier that has the advantage reducing weight and space requirements due to reducing the number of necessary components, which increases transmission and vehicle efficiency. Furthermore, the present invention overlaps the actuating and compensating chambers that are employed to control the operation of the clutches. Thus, the manufacturing process is also simplified and made more efficient.

The invention has been described in an illustrative manner. It is to be understood that the terminology, which has been used is intended to be in the nature of words of description rather than of limitation. Many modifications and variations of the invention are possible in light of the above teachings. Therefore, within the scope of the claims, the invention may be practiced other than as specifically described.

We claim:

1. A dual clutch transmission having radially nested clutches comprising:
    an outer clutch having a plurality of first outer clutch disks, a plurality of first inner clutch disks, and a first inner support carrier, said first inner clutch disks and said first outer clutch disks operatively and alternately disposed between each other, said first inner clutch disks operatively mounted to said first inner carrier;
    an inner clutch having a plurality of second outer clutch disks, a plurality of second inner clutch disks, and a second inner support carrier, said second inner clutch disks and said second outer clutch disks operatively and alternately disposed between each other, said second inner clutch disks operatively mounted to said second inner carrier;
    a common disk carrier having a first outer clutch disk carrier that operatively supports said first outer clutch disks of said outer clutch and a second outer clutch disk carrier that operatively supports said second outer clutch disks of said inner clutch;
    a first actuating piston adapted to cause said first inner and said first outer disks of said outer clutch to operatively engage each other, and a second actuating piston adapted to cause said second inner and said second outer disks of said inner clutch to operatively engage each other; and
    a guide cylinder wherein said first actuating piston is disposed between said guide cylinder and said common disk carrier such that said guide cylinder and said first actuation piston form a pressure chamber that is adapted to be pressurized to cause said first actuating piston to actuate said outer clutch, and said first actuation piston and said common disk carrier form a compensation chamber that is adapted to be pressurized to compensate for excess outer clutch actuation pressure.

2. A dual clutch transmission as set forth in claim 1 that further includes a compensating piston wherein said second actuating piston is disposed between said compensating piston and said common disk carrier such that said common disk carrier and said second actuation piston form a pressure chamber that is adapted to be pressurized to cause said second actuating piston to actuate said inner clutch, and said second actuation piston and said compensating piston form a compensation chamber that is adapted to be pressurized to compensate for excess inner clutch actuation pressure.

3. A dual clutch transmission as set forth in claim 1 wherein said second outer clutch disk carrier is a separate element from said common disk carrier and includes a plurality of axial teeth, and said common clutch disk carrier includes a like plurality of corresponding openings such that the engagement of said teeth within said openings axially locks said second outer clutch carrier to said common disk carrier.

4. A dual clutch transmission as set forth in claim 1 wherein said first actuating piston includes a plurality of circumferentially extending tabs and said common disk carrier includes a like plurality of corresponding openings such that said extending tabs extend though said openings to operatively engage said outer clutch assembly.

* * * * *